(12) United States Patent
Deichmann et al.

(10) Patent No.: US 11,297,770 B2
(45) Date of Patent: Apr. 12, 2022

(54) DRAPER BELT ASSEMBLY FOR AN AGRICULTURAL HARVESTER

(71) Applicant: CNH Industrial America LLC, New Holland, PA (US)

(72) Inventors: Scott Palmer Deichmann, Phoenixville, PA (US); Jonathan E. Ricketts, Coal Valley, IL (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 205 days.

(21) Appl. No.: 16/682,109

(22) Filed: Nov. 13, 2019

(65) Prior Publication Data
US 2021/0137009 A1    May 13, 2021

(51) Int. Cl.
| | |
|---|---|
| *A01D 61/02* | (2006.01) |
| *A01D 34/04* | (2006.01) |
| *A01D 61/00* | (2006.01) |
| *B65G 15/44* | (2006.01) |
| *B65G 15/46* | (2006.01) |

(52) U.S. Cl.
CPC ............. *A01D 61/02* (2013.01); *A01D 34/04* (2013.01); *A01D 61/006* (2013.01); *B65G 15/44* (2013.01); *B65G 15/46* (2013.01); *B65G 2201/04* (2013.01)

(58) Field of Classification Search
CPC ...... A01D 61/02; A01D 34/04; A01D 61/006; A01D 61/002; B65G 15/44; B65G 2201/04; B65G 15/46; B65G 15/42
See application file for complete search history.

(56) References Cited

U.S. PATENT DOCUMENTS

| | | | | |
|---|---|---|---|---|
| 2,987,169 | A * | 6/1961 | Hinchcliffe | ............ B65G 15/42 198/699 |
| 4,162,727 | A | 7/1979 | Summers | |
| 6,817,166 | B2 * | 11/2004 | Dunn | ..................... A01D 57/20 56/14.4 |

(Continued)

FOREIGN PATENT DOCUMENTS

| | | |
|---|---|---|
| EP | 2896283 A2 | 7/2015 |
| EP | 3581015 A1 | 12/2019 |

(Continued)

OTHER PUBLICATIONS

International Search Report and Written Opinion for Application No. PCT/US2020/060397 dated Mar. 9, 2021 (17 pages).

*Primary Examiner* — Arpad Fabian-Kovacs
(74) *Attorney, Agent, or Firm* — Peter Zacharias; Patrick Sheldrake

(57) ABSTRACT

A draper belt assembly for an agricultural harvester that includes a first roller, a second roller, and a draper belt surrounding the first and second rollers. The draper belt includes a front end, a rear end opposite the front end, and an upper surface extending from the front end to the rear end having a width substantially parallel to a longitudinal axis of one of the first and second rollers. The draper belt further includes a plurality of spaced apart lugs each extending in the widthwise direction having an anterior end distal to the rear end and a posterior end proximal to the rear end, wherein the anterior end is spaced from the front end of the draper belt at least about 15 mm.

20 Claims, 4 Drawing Sheets

(56) References Cited

U.S. PATENT DOCUMENTS

| | | | |
|---|---|---|---|
| 7,182,202 B2* | 2/2007 | Kalverkamp | B65G 17/02 198/844.1 |
| 7,543,428 B1* | 6/2009 | Puryk | A01D 57/20 56/1 |
| 7,549,280 B2 | 6/2009 | Lovett et al. | |
| 7,661,256 B2* | 2/2010 | Coers | A01D 61/002 56/181 |
| 9,517,886 B2* | 12/2016 | Petersen | B65G 15/42 |
| 9,750,189 B2 | 9/2017 | Honey et al. | |
| 9,771,220 B1* | 9/2017 | Honeycutt | B65G 15/40 |
| 9,795,086 B2* | 10/2017 | Hasenour | A01D 41/14 |
| 9,814,183 B2 | 11/2017 | Allochis | |
| 2002/0139643 A1* | 10/2002 | Peltier | B65G 67/24 198/821 |
| 2007/0238565 A1* | 10/2007 | Marler | B65G 15/34 474/237 |
| 2008/0202090 A1* | 8/2008 | Lovett | A01D 61/002 56/208 |
| 2008/0276591 A1* | 11/2008 | Tippery | B65G 15/42 56/181 |
| 2009/0007533 A1* | 1/2009 | Lovett | A01D 61/002 56/14.5 |
| 2009/0320431 A1* | 12/2009 | Puryk | A01D 41/14 56/181 |
| 2010/0326798 A1* | 12/2010 | Friesen | B65G 15/08 198/823 |
| 2012/0291412 A1* | 11/2012 | Lovett | A01D 61/002 56/181 |
| 2014/0165526 A1 | 6/2014 | Leys et al. | |
| 2015/0195993 A1* | 7/2015 | Hasenour | A01D 61/002 56/153 |
| 2016/0272427 A1* | 9/2016 | Kaeb | B65G 15/08 |
| 2016/0345497 A1* | 12/2016 | Hasenour | A01D 57/20 |
| 2018/0338425 A1* | 11/2018 | Cook | A01D 57/20 |
| 2019/0104682 A1* | 4/2019 | Mossman | A01D 41/14 |
| 2019/0104684 A1* | 4/2019 | Hasenour | A01D 41/14 |

FOREIGN PATENT DOCUMENTS

| | | | | |
|---|---|---|---|---|
| FR | 3000730 A1 * | 7/2014 | | B65G 17/18 |
| WO | 2018172963 A1 | 9/2018 | | |
| WO | 2019221886 A1 | 11/2019 | | |

* cited by examiner

DRAPER BELT ASSEMBLY FOR AN AGRICULTURAL HARVESTER

The following exemplary embodiments of the present invention relate generally to a header of a plant cutting machine (e.g., a combine harvester) and, more specifically, to a header having a draper belt assembly that includes a lugged draper belt with an expanded planar area.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure or a row unit with gathering chains and deck plates.

After crops are cut, they are collected inside the header and transported via a lugged draper belt towards the center of the header (e.g., to a feederhouse). Draper belts, particularly lateral draper belts, can exhibit plugging at the front end of the belt as crop material enters the belt from the cutter bar. This plugging can occur, for example, when the infeed belt does not pull crop material away quick enough or if there is a blockage or other adverse crop material flow condition in the exchange area between the lateral and infeed draper belts.

There thus remains a need to increase the efficiency of draper belts on agricultural harvesters to transport crop material, while avoiding adverse plugging and crop flow conditions.

SUMMARY OF THE INVENTION

In accordance with an exemplary embodiment, the subject disclosure provides a draper belt assembly for an agricultural harvester that includes a first roller, a second roller, and a draper belt surrounding the first and second rollers. The draper belt includes a front end, a rear end opposite the front end, and an upper surface extending from the front end to the rear end having a width substantially parallel to a longitudinal axis of one of the first and second rollers. The draper belt further includes a plurality of spaced apart lugs each extending in the widthwise direction having an anterior end distal to the rear end and a posterior end proximal to the rear end, wherein the anterior end is spaced from the front end of the draper belt at least about 15 mm.

In accordance with yet another exemplary aspect, the subject disclosure provides a header for an agricultural harvester that includes a cutter bar extending a width of the header, a guard adjacent to and extending rearwardly from the cutter bar and a first draper belt adjacent the cutter bar. The first draper belt includes a width extending perpendicular to a traveling direction of the draper belt. The first draper belt also includes a front end, a rear end opposite the front end, and an upper surface extending from the front end to the rear end, and a plurality of lugs each extending in the widthwise direction of the first draper belt having an anterior end distal to the rear end and a posterior end proximal to the rear end. The anterior end is spaced from the front end a distance substantially equal to or greater than one-half a distance the guard extends rearwardly of the cutter bar.

In an exemplary embodiment, the anterior end of each spaced apart lugs is spaced from the front end of the draper belt about 20-30 mm. In certain embodiments, the draper belt includes a planar upper surface (e.g., a planar surface along an entirety of a width of the front end) extending from the front end to about 15-30 mm from the front end. Each of the plurality of spaced apart lugs can extend a length in the widthwise direction of, for example, about 900-1,000 mm.

BRIEF DESCRIPTION OF THE DRAWINGS

The foregoing summary, as well as the following detailed description of the exemplary embodiments, will be better understood when read in conjunction with the appended drawings. For illustration purposes, there are shown in the drawings exemplary embodiments. It should be understood, however, that the subject disclosure is not limited to the precise arrangements and instrumentalities shown.

DETAILED DESCRIPTION OF THE DRAWINGS

Figure 1:
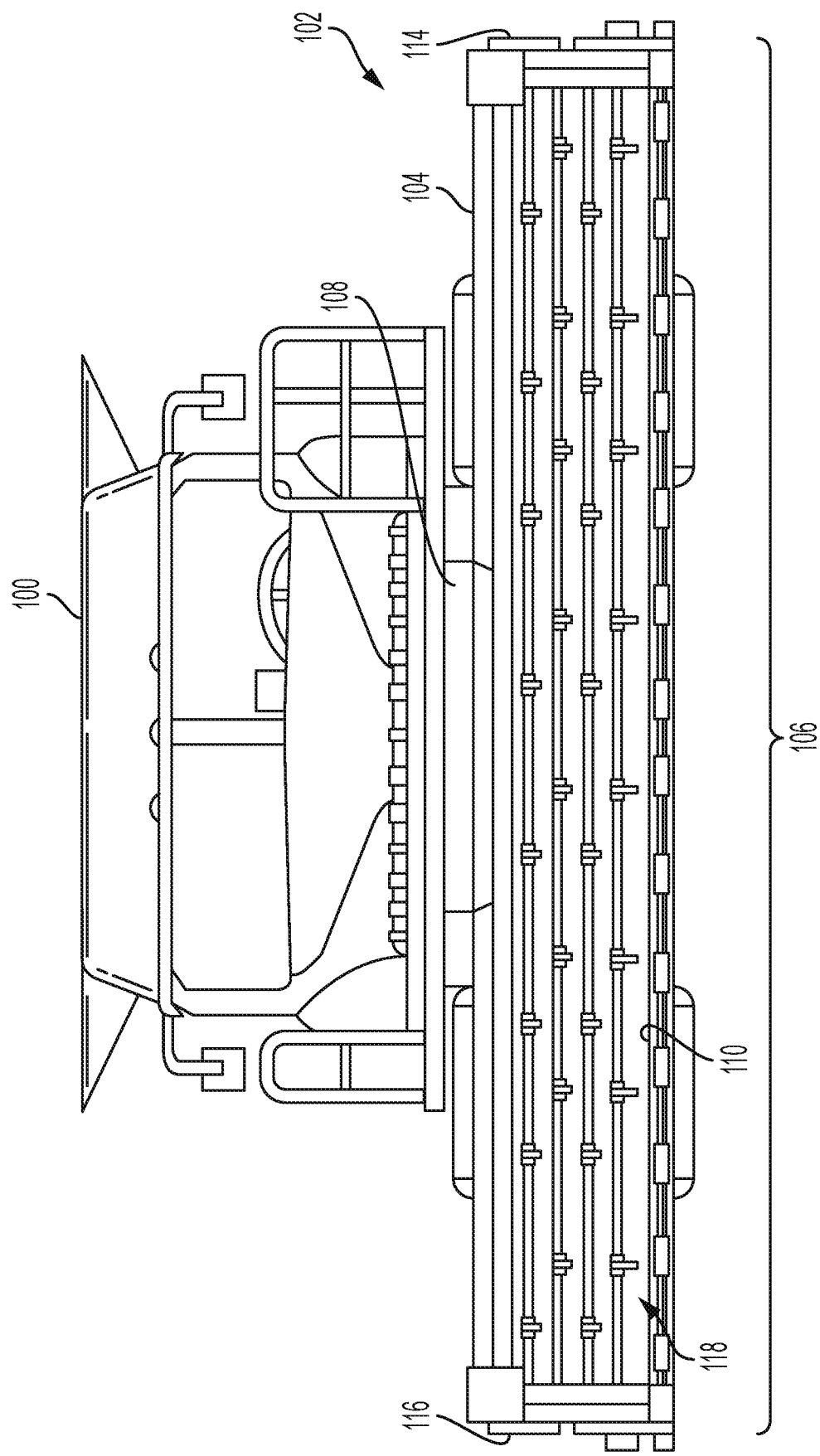
FIG. 1 is a front elevation view of an agricultural harvester including a header.

Reference will now be made in detail to the various exemplary embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below, front, real, and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. Exemplary embodiments of the header described herein is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±15%, ±10%, ±5%, ±1%, or ±0.1% from the specified value, as such variations are appropriate. Similarly, "substantially equal" refers to values that are approximately equal, but encompassing variations of ±20%, ±15%, ±10%, ±5%, ±1%, or ±0.1% from the other value, as such variations are appropriate.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments.

"Substantially" as used herein shall mean considerable in extent, largely but not wholly that which is specified, or an appropriate variation therefrom as is acceptable within the field of art.

Referring now to the drawings, there is illustrated an agricultural harvester 100. For exemplary purposes only, the agricultural harvester is illustrated as a combine harvester. The harvester 100 includes a header 102 comprising a frame 104, a cutter bar 106 and a conveyor assembly. In an exemplary embodiment, the conveyor assembly comprises a left draper belt assembly 300A and a right draper belt assembly 300B.

Figure 2:
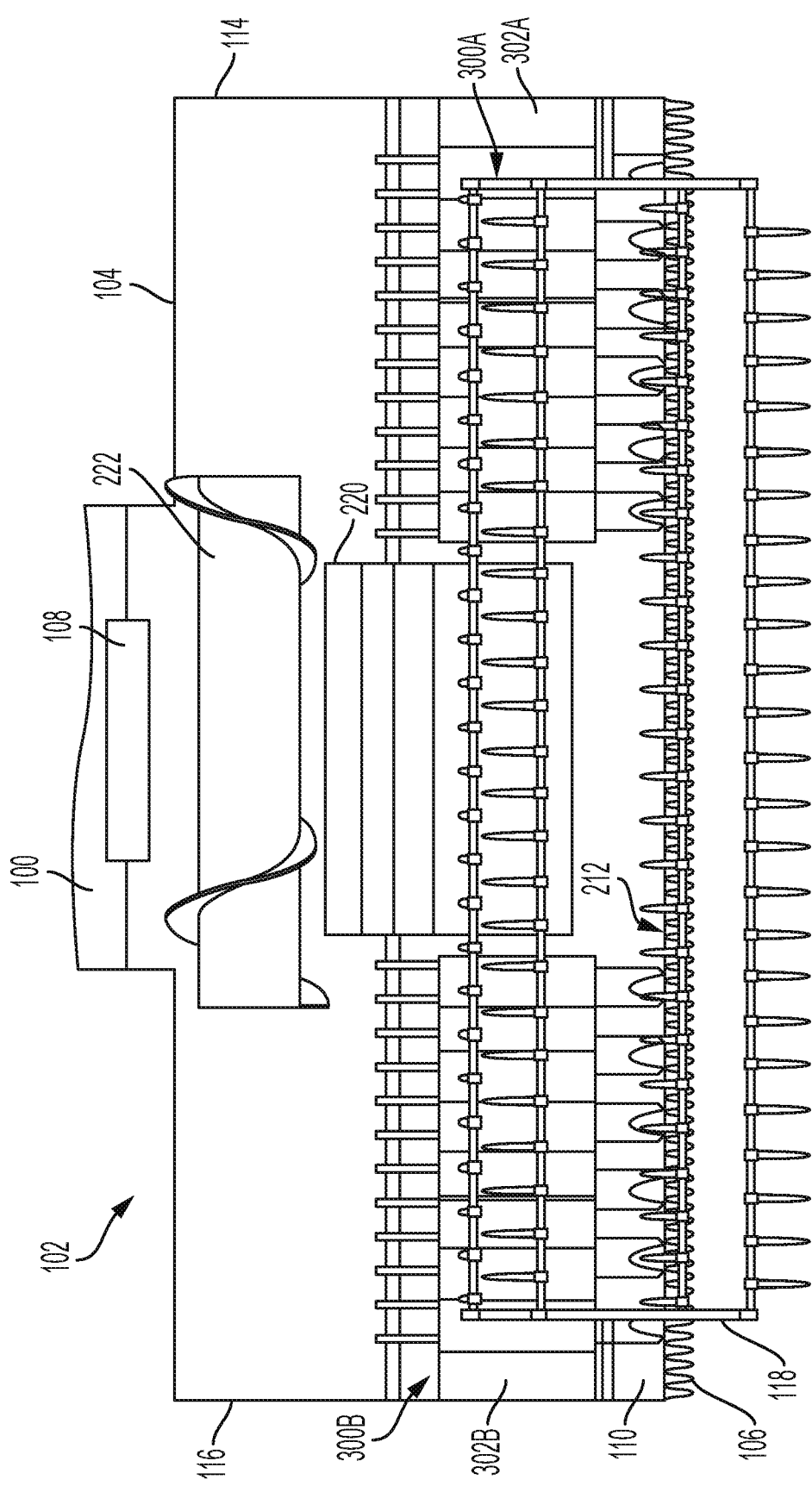
FIG. 2 is a schematic view of the header of FIG. 1.

Referring now to FIGS. 1 and 2, the frame 104 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 108 as the harvester 100 moves forward over a crop field.

The header 102 includes a floor 110 that is supported in desired proximity to the ground surface. The cutter bar 106 of the header 102 extends transversely along a forward edge 212 of the floor i.e., in a widthwise direction of the harvester 100, and is bound by a first side edge 114 and an opposing second side edge 116, which are both adjacent to the floor 110. The cutter bar 106 is configured to cut crops in preparation for induction into the feederhouse 108. It is appreciated that the cutter bar 106 includes one or more reciprocating sickles such as those disclosed in U.S. Pat. No. 8,151,547.

The header 102 may further include an elongated, rotatable reel 118 which extends above and in close proximity to the cutter bar 106. The reel 118 is configured to cooperate with the draper belt assembly, specifically the draper belt sub-assemblies 300A, 300B, and an infeed draper belt 220 in conveying cut crops to the feederhouse 108. The draper belt assemblies 300A, 300B, which include draper belts 302A/302B, and infeed draper belt 220 are configured to convey the cut crops into the harvester 100, and, more specifically, towards the feederhouse 108, for threshing and cleaning. Draper belts 220, 302A and 302B are provided with lugs 312 to facilitate gripping and transporting the cut crop in the travelling direction of the draper belt. Additionally, the header 102 may include a rotatable auger 222, e.g., a conveyor screw, to facilitate feeding into the feederhouse 108.

While the foregoing aspects of the harvester 100 are being described with respect to the header shown, the draper belt sub-assembly 300A of the subject disclosure can be applied to any other header having use for such a draper belt sub-assembly.

Figure 3:
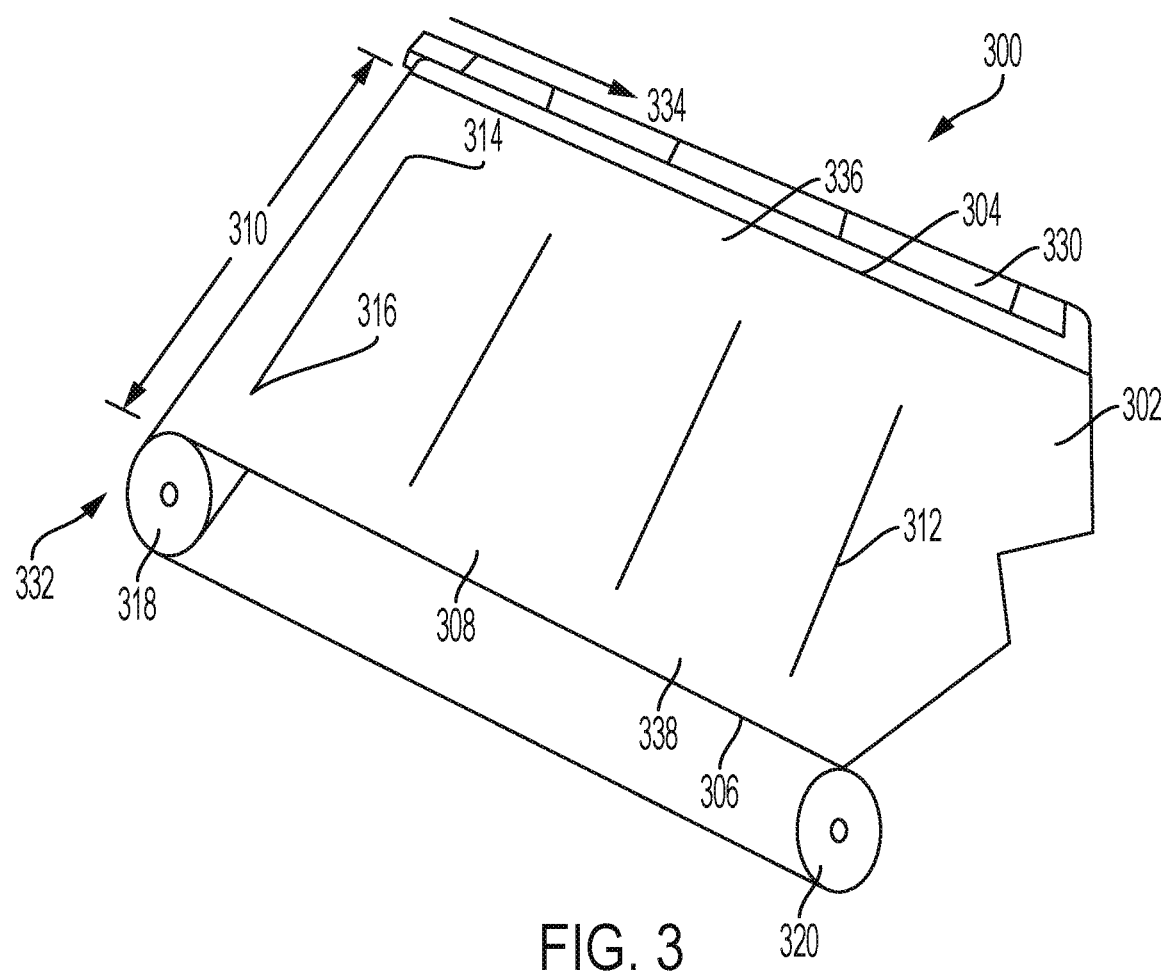
FIG. 3 is a partial schematic view of a draper belt assembly according to an exemplary embodiment of the subject disclosure, with certain structural features omitted for clarity.
Figure 4:
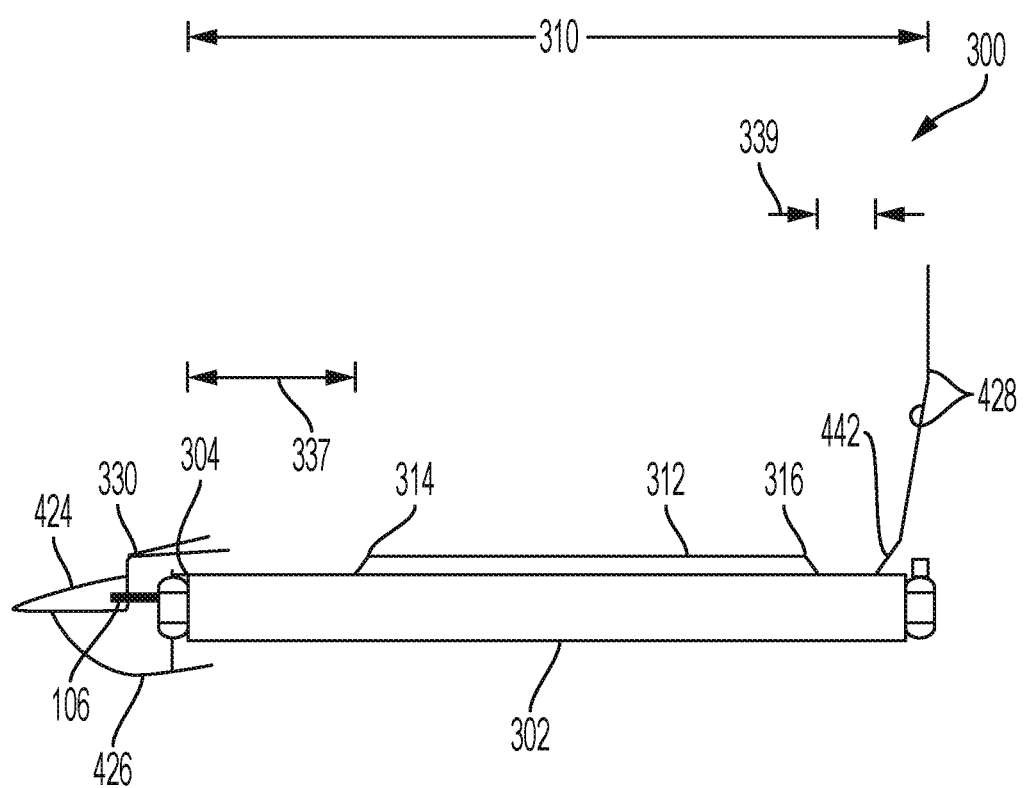
FIG. 4 is a side schematic view of the draper belt and assembly of FIG. 2.

FIGS. 2-4, best illustrates the draper belt assembly 300A according to the present exemplary embodiment. Draper belt assembly 300B is configured substantially the same as 300A and is collectively denoted 300 in FIGS. 3 and 4. Draper belt 302 is provided having a front end 304, a rear end 306 opposite the front end 304, and an upper surface 308 extending from the front end 304 to the rear end 306 having a width 310. The width 310 can be constant along the longitudinal length of the draper belt 302 as shown in FIG. 2, or alternatively the belt width 310 can vary. The width 310 of the draper belt can be, for example, in a range of 500-1500 mm, and in this particular embodiment, has a width of about 1030 mm. Alternatively, draper belts having shorter or wider widths can be employed, depending on the application, e.g., 500 mm, 600 mm, 700 mm, 800 mm, 900 mm, 1000 mm, 1100 mm, 1200 mm, 1300 mm, 1400 mm, and greater than 1500 mm.

The upper surface 308 is provided with a plurality lugs 312 each having an anterior end 314 distal to the rear end 306 and a proximal end 316 opposite the anterior end 314 and proximal to the rear end 306. The anterior end 314 and/or proximal end 316 can be machined at an angle as shown in FIG. 4, or can alternatively be provided at a right angle (as viewed from the side as oriented in FIG. 4). The length of a lug, as measured from the anterior end 314 to the posterior end 316, can range, for example, from about 900-1150 mm, or extend about 950 mm, 1000 mm, 1050 mm, 1100 mm, 1200 mm, 1300 mm or greater. Other lug lengths can be provided depending on the size of the draper belt.

As best shown in FIG. 3, the draper belt assembly 300 includes a first roller 318. The longitudinal axis defined by the first roller 318 is substantially parallel to the width 310 of the draper belt 302. The draper belt assembly 300 further includes a second roller 320 opposite the first roller 318, with a longitudinal axis defined by second roller 320 that is also substantially parallel to the width 310 of the draper belt.

As best shown in FIG. 4, the header includes the flexible cutter bar 106. Knife and guard 424 can extend outwardly from the cutter bar. Skid shoes 426 can be provided adjacent to the front end 304. A back sheet 428 can be provided along the back end 306 of the draper belt, where it proceeds toward the draper belt at an angle. A rubber seal 442, originating from the draper belt 302 at an angle and proceeding upward to engage the back sheet 428 can optionally be provided. Alternatively, the back sheet 428 can directly contact the draper belt 302 and a rubber seal 442 is not provided.

Referring to FIG. 4, guard 330, which can be composed of a hard, sturdy material, originates from the cutter bar 106 and extends over the front edge 304 of the draper belt 302. In certain embodiments, the guard extends 10 to 40 mm or 20 to 30 mm from the cutter bar, though other lengths can be provided. In certain embodiments, the guard provides a smooth surface for crop material to traverse in route to the draper belt 302.

The guard 330 is provided at a height equal to or greater than the height of the upper surface 308 of the draper belt so as to ensure that cut crop material is deposited on the functional upper surface 308 of the draper belt, and to prevent crop material from entering the non-functional "side" of the belt assembly (e.g., below the upper surface 308) where the crop material cannot be properly transported by the draper belt 302.

In operation, one or more of the rollers is driven by a drive mechanism (not shown) to rotate in a direction 332 that moves the draper belt towards the center of the header in direction 334, along with any crop material deposited thereon.

The draper belt 302 in this particular exemplary embodiment is provided with a front planar upper surface 336 which has a front width 337 originating from the front end 304, and ending at the anterior end 314 of the lug. The front planar upper surface 336 does not contain lugs 312 and is generally smooth.

According to certain non-limiting exemplary embodiments, a back planar upper surface 338 is provided that also has an absence of lugs and is generally smooth. In this particular exemplary embodiment, back planar upper surface 338 has a width 339 originating from the posterior end 316 of the lug 312 and proceeding to the rubber seal 442 to the back sheet 428. In other exemplary embodiments, the lugs can proceed to or almost to the rubber seal 442 (if provided, or if not, to back sheet 428) and a back planar upper surface 338 is not provided.

While the lugs 310 can be provided (e.g., designed or retrofit) to have a constant width, the width of the individual lugs can vary and thus the boundaries of the front planar upper surface and back planar upper surface (if present) can be defined along the length of the draper belt 302 by the varying lengths of the lugs 312.

In certain exemplary embodiments, the width 337 of the front planar upper surface 336 is at least about 15 mm, at least about 16 mm, at least about 17 mm, at least about 18 mm, at least about 19 mm, at least about 20 mm, at least about 21 mm, at least about 22 mm, at least about 23 mm, at least about 24 mm, or at least about 25 mm. In certain exemplary embodiments, an entirety of the width 337 of the draper belt (i.e. the minimum width of the front planar surface along the entire length of the draper belt) is at least about 15 mm, at least about 16 mm, at least about 17 mm, at least about 18 mm, at least about 19 mm, at least about 20 mm, at least about 21 mm, at least about 22 mm, at least about 23 mm, at least about 24 mm, or at least about 25 mm. In one exemplary embodiment, the width 337 of the front planar upper surface 336 is about 22 mm.

In certain exemplary embodiments, the width 339 of the back planar upper surface 338 at one or more lugs is at least about 15 mm, at least about 16 mm, at least about 17 mm, at least about 18 mm, at least about 19 mm, at least about 20 mm, at least about 21 mm, at least about 22 mm, at least about 23 mm, at least about 24 mm, or at least about 25 mm. In certain exemplary embodiments, an entirety of a width 339 of the draper belt (i.e. the minimum width of the back planar surface along the entire length of the draper belt) is at least about 15 mm, at least about 16 mm, at least about 17 mm, at least about 18 mm, at least about 19 mm, at least about 20 mm, at least about 21 mm, at least about 22 mm, at least about 23 mm, at least about 24 mm, or at least about 25 mm.

In certain exemplary embodiments, the anterior end 314 is spaced from the front end 304 a distance substantially equal to or greater than one-half the distance the guard 330 extends rearwardly of the cutter bar. In other exemplary embodiments, the anterior end 314 is spaced from the front end 304 a distance substantially equal to or greater than 0.55 (55%), a distance substantially equal to or greater than 0.60 (60%), a distance substantially equal to or greater than 0.65 (65%), or substantially equal to or greater than 0.70 (70%), or substantially equal to or greater than 0.75 (75%), or substantially equal to or greater than 0.80 (80%), or substantially equal to or greater than 0.85 (85%), or substantially equal to or greater than 0.90 (90%), or substantially equal to or greater than 0.95 (95%) the distance the guard 330 extends rearwardly of the cutter bar. In other exemplary embodiments, the anterior end 314 is spaced from the front end 304 a distance substantially equal to or greater than the distance the guard extends 330 rearwardly of the cutter bar.

In certain exemplary embodiments, the draper belt is located adjacent to the cutter bar, the guard 330 provides a smooth surface and extends about 20-30 mm from the cutter bar, and the front planar upper surface of the draper belt has a width of about 22 mm. In certain exemplary embodiments, the total length of the guard 330 from the cutter bar plus the width 337 of the front planar upper surface can be about 42 mm to 52 mm, or less than 42 mm or greater than 52 mm.

Unlike the draper belt 302 of the present disclosure, the lugs on a lugged draper belt of the prior art generally begin at or about the location of the guard 330 and proceeds to or about the back sheet 306, and do not contain a front planar upper surface 336 or a back planar upper surface 338. It has been found that providing a lugged draper belt with an expanded smooth area (i.e., a front planar upper surface 336) greatly reduces the events of crop material being pulled back "under" the draper belt as material is being transported in a moving direction of the draper belt (e.g., as crop material travels from the draper belt onto the infeed draper belt). The absence of lugs in the area defined by the front planar upper surface decreases the propensity of the lugs to "grab" crop material and pull it back, for example, under the drive roller of the lateral draper belt.

While the subject disclosure has been described with reference to exemplary embodiments, it will be appreciated by those skilled in the art that various changes may be made and equivalents may be substituted for elements thereof without departing from the scope of the exemplary embodiments. For example, features described in one embodiment may be incorporated into a different embodiment. Additionally, features described in one manner may instead be accomplished by known techniques in the art.

In addition, modifications may be made to adapt a particular situation or material to the teachings of the various exemplary embodiments without departing from the essential scope thereof. For example, the header can include one or more cutter bar support assemblies acting in tandem with one another, each identical or different from each other, to support the cutter bar, as well as one or more draper belt assemblies attached to the header. It is to be understood, therefore, that the exemplary embodiments not be limited to the particular aspects disclosed, but it is intended to cover modifications within the spirit and scope of the exemplary embodiments as defined by the appended claims.

We claim:

1. A header for an agricultural harvester comprising:
a cutter bar extending in a widthwise direction of the header; and a lateral draper belt assembly that includes:
a first roller,
a second roller, and
a draper belt surrounding the first and second rollers, the draper belt including:
a front end proximate the cutter bar,
a rear end opposite the front end and distal to the cutter bar, and
an upper surface extending from the front end to the rear end having a width substantially parallel to a longitudinal axis of one of the first and second rollers, and
a plurality of spaced apart lugs each extending in a widthwise direction having an anterior end distal to the rear end and spaced from the front end a first distance, and a posterior end proximal to the rear end and spaced from the rear end a second distance less than the first distance.

2. The header of claim 1, wherein the anterior end is spaced from the front end of the draper belt about 20-30 mm.

3. The header of claim 1, wherein the draper belt includes a planar upper surface extending from the front end to about 15-30 mm from the front end.

4. The header of claim 1, wherein an entirety of a width of the front end of the draper belt includes a planar upper surface extending from the front end to about 15-30 mm from the front end.

5. The header of claim 1, wherein each of the plurality of spaced apart lugs extends a length in the widthwise direction of about 900-1,000 mm.

6. The header of claim 1, wherein the first distance is at least 15 mm.

7. The header of claim 1, wherein the first distance is about 15-20 min.

8. The header of claim 1, wherein the first distance is about 20-25 mm and the second distance is about 15-20 mm.

9. The header of claim 1, wherein the first distance is at least 25 mm.

10. A header for an agricultural harvester comprising:
a cutter bar extending a width of the header;
a first draper belt adjacent the cutter bar, the first draper belt having a width extending perpendicular to a traveling direction of the draper belt, the first draper belt including:
a front end, a rear end opposite the front end, and an upper surface extending from the front end to the rear end, and
a plurality of lugs each extending in the widthwise direction of the first draper belt having an anterior end distal to the rear end and a posterior end proximal to the rear end,
wherein the anterior end is spaced from the front end a distance substantially equal to or greater than one-half a distance the guard extends rearwardly of the cutter bar; and
a guard adjacent to and extending rearwardly from the cutter bat above the front end of the first draper belt.

11. The header of claim 10, wherein the anterior end is spaced from the front end a distance substantially equal to or greater than 75% a distance the guard extends rearwardly of the cutter bar.

12. The header of claim 10, wherein the first draper belt includes a front planar upper surface extending from the front end to about 15-30 mm from the front end.

13. The header of claim 10, wherein an entirety of a width of the front end of the first draper belt includes a front planar upper surface extending from the front end to about 15-30 mm from the front end.

14. The header of claim 10, wherein each of the plurality of lugs extends a length in the widthwise direction of about 900-1,000 mm.

15. The header of claim 10, wherein each of the guards extends about 20 to 30 mm from the cutter bar.

16. The header of claim 10, further comprising:
a second draper belt adjacent the cutter bar; and
an infeed belt adjacent the first and second draper belts.

17. An agricultural harvester comprising the header of claim 10.

18. The header of claim 10, wherein the guard extends from the cutter bar about 20 to 30 mm.

19. The header of claim 10, further comprises a back sheet adjacent the rear end of the draper belt.

20. The header of claim 10, wherein the anterior end is spaced from the front end of the first draper belt a first distance, and the posterior end of each of the plurality of lugs is spaced from the rear end of the first draper belt a second distance less than the first distance.

* * * * *